Aug. 25, 1964 P. GRANDSTAFF 3,145,570
PRESSURE GAGE
Filed May 16, 1961 3 Sheets-Sheet 1

INVENTOR.
PERRY GRANDSTAFF
BY

ATTORNEYS

Aug. 25, 1964   P. GRANDSTAFF   3,145,570
PRESSURE GAGE
Filed May 16, 1961   3 Sheets-Sheet 2

INVENTOR.
PERRY GRANDSTAFF
BY
Fishburn & Gold
ATTORNEYS

Aug. 25, 1964  P. GRANDSTAFF  3,145,570
PRESSURE GAGE
Filed May 16, 1961  3 Sheets-Sheet 3
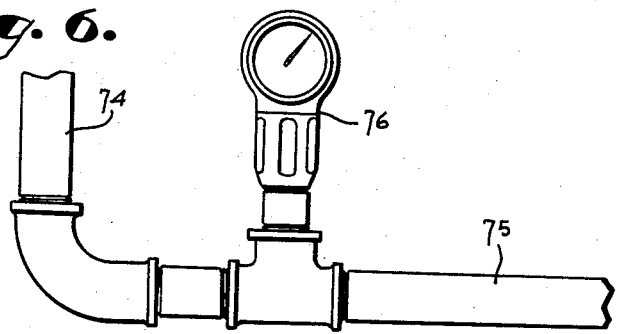
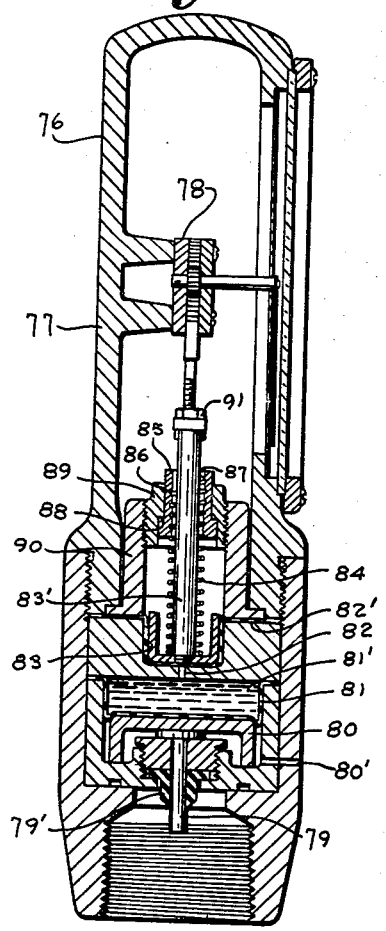
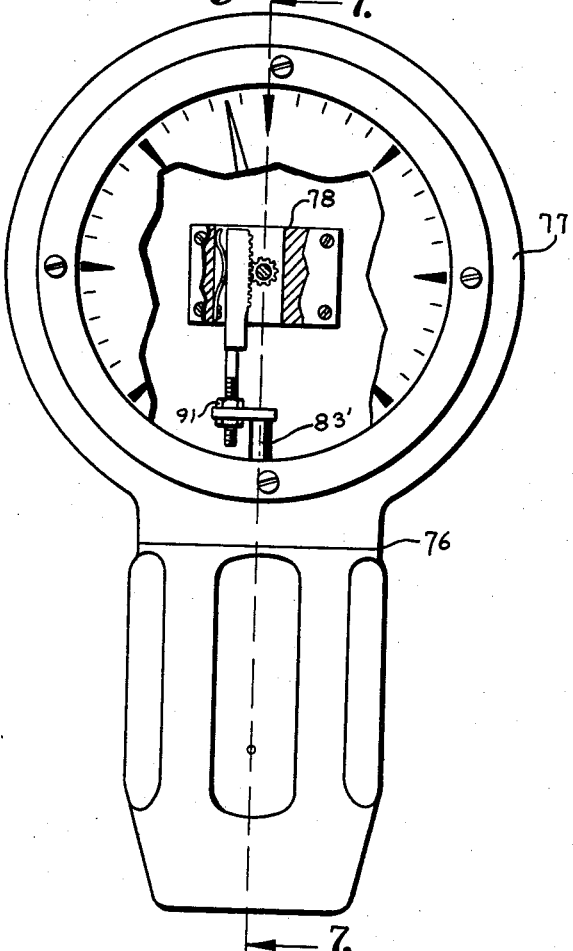
INVENTOR.
PERRY GRANDSTAFF
BY
*Fishburn & Gold*
ATTORNEYS United States Patent Office 3,145,570
Patented Aug. 25, 1964

3,145,570
PRESSURE GAGE
Perry Grandstaff, Oklahoma City, Okla., assignor to Drilling Equipment Manufacturing Co., Oklahoma City, Okla., a corporation of Oklahoma
Filed May 16, 1961, Ser. No. 110,372
4 Claims. (Cl. 73—419)

This invention relates to pressure gages, and more particularly to improvements in the construction of fluid pressure gages and deflecting mechanisms therefor.

The principal objects of the present invention are: to provide a pressure gage of extremely simple construction which is adjustable in deflection rate, as well as load range; to provide such a gage which includes a simple adjusting member for calibrating the gage spring to achieve the exact deflection rate desired; to provide such a gage construction wherein high pressures may be measured while maintaining low pressures and forces on sensitive parts of the gage; to provide a gage assembly having a reciprocally mounted piston hydraulically movable without the use of high friction sliding seals heretofore necessary to control leakage past the piston; to provide such a gage construction having a sensing assembly isolated from the gage assembly, but communicating therewith by means of a trapped pressure-transmitting fluid which is in turn isolated from the fluid being measured; to provide a gage construction which substantially eliminates the possibility of corrosive fluids entering the gage assembly; to provide such a construction wherein the isolating pressure-transmitting fluid provides damping of the gage by restricting the free flow of said fluid; to provide such a device which is adaptable for measuring mud pressure in the drilling of wells, as well as finding many other industrial applications; and to provide such a pressure gage which is inexpensive to produce and yet accurate, repeatable and reliable in use.

Other objects and advantages of this invention will become apparent from the following description taken in connection with the accompanying drawings wherein are set forth by way of illustration and example certain embodiments of this invention.

FIG. 6 is a view in side elevation of a mud pressure gage installed on a typical stand pipe on a drilling mud line.

FIG. 7 is a sectional view on an enlarged scale of the mud pressure gage, taken on the line 7—7, FIG. 8.

FIG. 8 is a view in side elevation on an enlarged scale of the mud pressure gage with a portion broken away.

Figure 1:
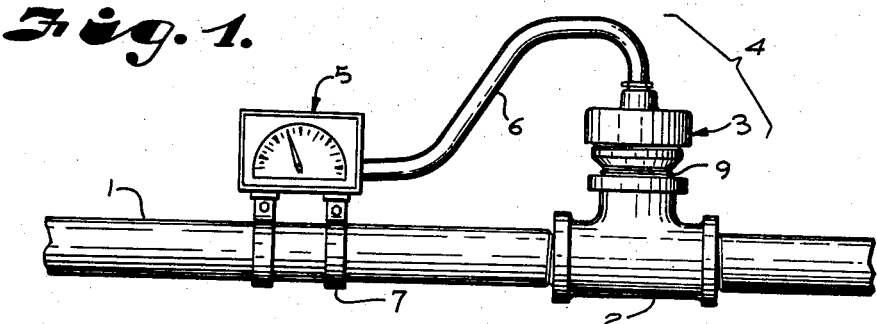
FIG. 1 is a view in side elevation of a typical gage installation wherein the sensing assembly is remote from the gage assembly.

Referring to the drawings in more detail:

The reference numeral 1 indicates a pipe line containing a fluid under high pressure. A T fitting 2 is secured in the line 1 and has threadedly connected therewith a sensing assembly 3 of a fluid pressure gage generally indicated at 4. The fluid pressure gage 4 includes a gage assembly 5 operatively connected to the sensing assembly 3 with an hydraulic hose 6. The gage assembly 5 is illustrated as secured to the pipe line 1 with suitable brackets 7; however, other locations and mounting devices for the gage assembly 5 may be provided without departing from the scope of this invention.

The sensing assembly 3 includes a pressure connector 8 having external threads 9 and internal threads 10. In the illustration of FIG. 1, the external threads 9 are engaged with the T fitting 2; however, in some instances, it may be desirable to connect the sensing assembly 3 to the pressure line 1 with an hydraulic hose (not shown) in which case the internal threads 10 may be utilized.

The pressure connector 8 has a side wall 10' presenting an inside cylindrical side surface 11 and an inside end wall 11' presenting an end surface 12. The surfaces 11 and 12 define a cylindrical cavity 13. A cap 14 exhibits internal threads 15 adapted to be engaged with external threads 16 on the outside surface of the wall 10'. The cap 14 closes the cavity 13 for a purpose described hereinafter.

Figure 4:
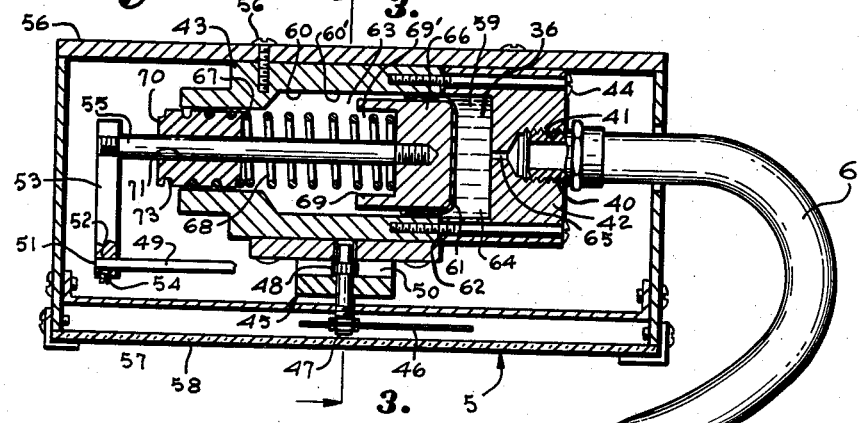
FIG. 4 is a sectional view on an enlarged scale through the sensing assembly and gage assembly showing the parts therein under deflection.
Figure 5:
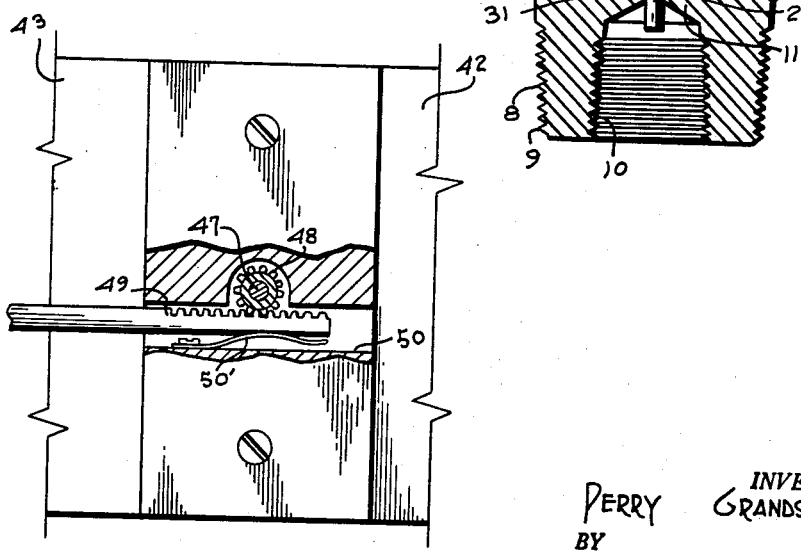
FIG. 5 is a fragmentary sectional view on an enlarged scale showing a rack and pinion used in the gage assembly to translate reciprocatory motion into rotary motion.

A flexible diaphragm 17, which is preferably of the type composed of rubber reinforced with nylon fibers and known as a "Bellofram Seal," has the periphery 18 thereof secured between the inner surface 19 of the cap 14 and the end or terminating edge 20 of the wall 10'. The flexible diaphragm 17 extends into the cavity 13 and divides said cavity into two chambers respectively designated 21 and 22. A cylindrical piston 23 is contained in the chamber 21 and is shaped to provide a recessed cylindrical central portion 24 formed by an integral skirt 25 extending toward the end surface 12. The piston 23 exhibits an outer surface 26 which contacts the flexible diaphragm 17. The outside diameter of the piston 23, including the skirt 25, is of a size which permits the diaphragm 17 to fold between the inside cylindrical surface 11 and the piston when the piston is moved toward the cap 14, as best illustrated at 27, FIG. 4.

An elongated plunger 28 exhibits a shank 29, of substantially smaller diameter than the outside diameter of the piston 23, and a head 30. A bore 31 extends through the end wall 11' and past the end surface 12 and is coaxial with the cavity 13. The plunger shank 29 closely fits and slidably extends through the bore 31 and into the cavity 13. The plunger head 30 contacts the inner surface 31' of the piston 23.

A suitable seal such as an O-ring 32 surrounds the plunger shank 29 and is retained thereagainst by means of a threaded packing member 33 engaging with internal threads 34 formed in the walls of a depression 34' extending into the end wall 11'. The packing member 33 exhibits an annular groove 35 which contains the O-ring 32 and forces same against the plunger shank 29 and against the end wall 11' to provide an efficient fluid seal therebetween while permitting reciprocal motion of the plunger 28. A drain hole 35' extends through the wall 10' into the chamber 21 to drain any fluid from the connector 8 which bleeds past the O-ring 32.

A pressure-transmitting fluid 36 such as hydraulic fluid is contained within the chamber 22 and isolated from the chamber 21 by means of the flexible diaphragm 17. The hydraulic hose 6 terminates at one end thereof in a threaded nipple 37 engaging a threaded socket 38 in the cap 14. A small bore or damping orifice 39 communicates between the socket 38 and the chamber 22 to permit the flow of the fluid 36 therethrough and into the hydraulic hose 6 at a restricted rate and under conditions described hereinafter. It is noted that both the size of the orifice 39 and the viscosity of the fluid 36 affect the rate of flow.

The hydraulic hose 6 terminates at the other end thereof in a threaded nipple 40 engaging with a threaded socket 41 in a block 42. The block 42 is secured to a sleeve 43 by means of elongated screws 44 extending longitudinally thereinto, FIG. 4. The sleeve 43 forms a frame or anchoring member for supporting a gauge pointer assembly 45 having a pointer 46 rotatably supported thereon by means of a shaft 47. The shaft 47 carries a pinion 48 fixed thereto and engaged with a rack 49 which is reciprocally guided in a groove 50 for rotating the pinion 48. A leaf spring 50' urges the rack 49 into engagement with the pinion 48. The end 51 of the rack 49 is adjustably secured in a bore 52 extending through a bar 53 by means of a set screw 54. The bar 53 is threadedly secured to a rod 55 extending into the sleeve 43 and longitudinally reciprocable with respect thereto through apparatus described hereinafter.

A box or container 56 is secured to the sleeve 43 by means of screws 56'. The container surrounds the block 42 and sleeve 43 and supports a dial face 57 adjacent the pointer 46. The container 56 also supports a viewing glass 58 to permit sighting the position of the pointer with respect to the dial face 57.

The block 42 exhibits a cylindrical cavity 59 opening toward the sleeve 43 and coaxial with the inside surface 60 of the sleeve 43, the cavity 59 and sleeve 43 forming a continuous cylindrical bore 60'. A flexible diaphragm 61 similar in construction to the diaphragm 17 described above has the periphery 62 thereof clamped between the block 42 and the sleeve 43. The diaphragm 61 extends into the cavity 59 and divides the bore 60' and cavity 59 into two chambers 63 and 64 respectively. The block 42 also contains a bore or damping orifice 65 communicating between the socket 41 and the chamber 64 to further restrict the flow of fluid 36 in the gage. It is apparent that the fluid 36 is trapped within the chambers 64 and 22 but is permitted to flow back and forth therebetween through the hydraulic hose 6 to transmit signals or intelligence from the sensing assembly 3 to the gage assembly 5.

A piston 66 is contained in the chamber 63 and is urged into contact with the flexible diaphragm 61 by means of a gage spring 67. The piston 66 is smaller in diameter than the bore 60' and cavity 59 whereby the flexible diaphragm 61 may fold between the piston 66 and the surface of the bore 60' in the manner indicated with respect to the flexible diaphragm 17. The gage spring 67 is a helical compression spring having a plurality of wire coils 68 which surround the rod 55. The rod 55 is threadedly engaged in the piston 66 and moves therewith. The piston 66 exhibits a lip 69 forming a socket 69' for retaining one end of the spring 67 coaxial and in fixed contact therewith.

Figure 2:
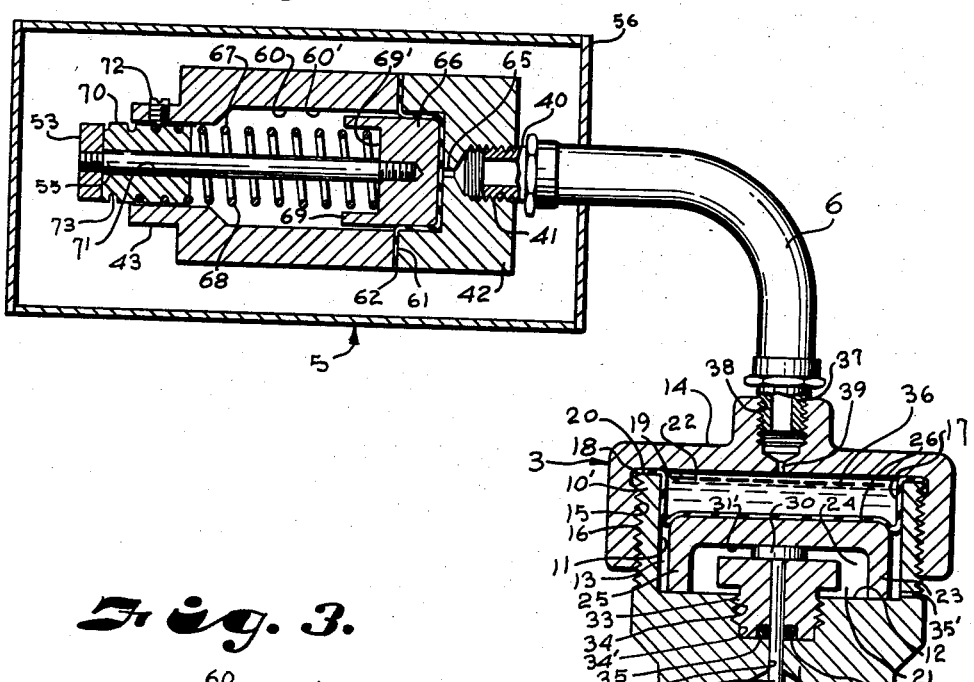
FIG. 2 is a sectional view on an enlarged scale through the sensing assembly and gage assembly, showing the position of the parts therein under zero deflection.
Figure 3:
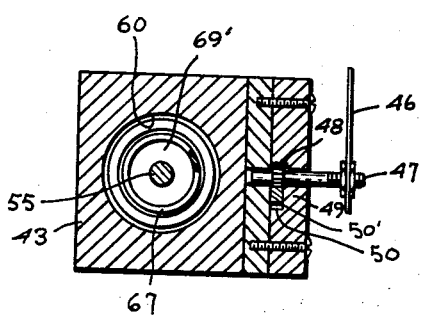
FIG. 3 is a sectional view on an enlarged scale through the gage assembly, taken on the line 3—3, FIG. 4.
Figure 3:
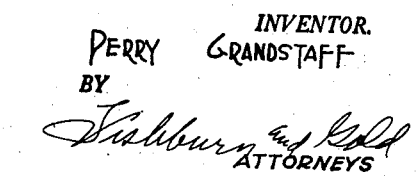

A retainer or collar 70 contains an axial bore 71 therethrough for slidably receiving the rod 55 and is retained in the sleeve 43 spaced from the piston 66 by means of a set screw 72 extending through the sleeve 43, FIG. 2. The collar 70 exhibits a helical groove 73 on the outer surface thereof which leads axially of the rod 55 and is adapted to adjustably receive one or more of the wire coils 68 of the gage spring 67 to make them inactive. The set screw 72 locks the spring wire in the groove 73 and also adjustably fixes the collar 70 longitudinally with respect to the sleeve 43. It is apparent that when the spring 67 is rotated with respect to the collar 70, the effective developed length of the spring or, in other words, the number of active wire coils in the spring extending between the collar 70 and piston 66 is altered.

In operation, fluid pressure is exerted against the plunger 28, which due to the relatively small cross sectional area of the shank 29 with respect to the piston 23, proportionally reduces the pressure per unit area otherwise exerted by the surface 26 of the piston. The fluid pressure causes the plunger 28 to urge the piston 23 against the flexible diaphragm 17 which in turn urges the fluid 36 out of the chamber 22 through the hydraulic hose 6 and into the chamber 64. The flow of fluid into the chamber 64 is accompanied by an increase in pressure against the flexible diaphragm 61 which causes an axial displacement of the piston 66 toward the collar 70, compressing the spring 67. The displacement of the piston 66 is reflected in an axial movement of the rod 55 which moves the bar 53 resulting in a rotational displacement of the pointer 46.

The sensing assembly 3 has been described as connected to a pressure line, however it is to be noted that the sensing assembly 3 may also provide an intermediate state of pressure reduction for reducing extremely high pressure to pressures suitable for delicate gage structures. In the latter case one or more additional assemblies such as sensing assembly 3 may be arranged in tandem, or in other words, in series whereby additional fluid containing chambers will be provided.

The configuration of the apparatus described permits an adjustment or calibration to achieve the desired variation in pointer deflection rate, as well as an adjustment of load range and zero setting without replacement of gage parts. The deflection rate, sometimes referred to as the gage factor, is altered as described above by rotating the collar 70 with respect to the gage spring 67 to add or remove active wire coils from the gage spring. The load range of the gage may be altered by adjusting the axial position of the collar 70 with respect to the sleeve 43 to increase or decrease the compression of the spring 67 at any given pointer deflection. The pointer zero setting may be adjusted without interference with the spring 67 by loosening the set screw 54 and moving the rack 49 with respect to the bar 53.

Another form of this invention is illustrated in FIGS. 6, 7 and 8 wherein a stand pipe 74 is operatively connected to a mud line 75 for well drilling operation. The pressure gage 76 is characterized in being encased in a single unit or frame 77 containing a rotatably mounted pointer assembly 78, plunger 79, plunger seal 79', a piston 80, drain hole 80', flexible diaphragm 81, hydraulic fluid 81', damping orifice 82, flexible diaphragm 82', piston 83, rod 83' and gage spring 84 similar in function to like parts described above. The collar 85 which supports one end of the spring 84, however, contains the spring supporting helical groove 86 on the wall of a bore 87 rather than on the outside surface. The spring 84 is positioned between the rod 83' and the collar 85. The collar 85 is retained against axial movement away from the diaphragm 82' by means of a shoulder 88 formed on a threaded annular ring 89 which is in turn engaged with a supporting sleeve 90 fixed with respect to the frame 77. Load range of the gage 76 may be adjusted by rotating the ring 89 with respect to the sleeve 90 to axially position the collar 85. Deflection rate may be adjusted by rotating the spring 84 with respect to the collar 85. The retention of the spring coils in the collar 85 is satisfactorily achieved by means of frictional contact with the grooves 86. The pointer zero setting may be adjusted with the lock nuts 91.

It is to be understood that while I have illustrated and described certain forms of my invention, it is not to be limited to the specific forms or arrangements or parts herein desecribed and shown except insofar as such limitations are included in the claims.

What I claim and desire to secure by Letters Patent is:

1. A fluid pressure gage comprising, a frame having a dial face secured thereto, a gage pointer mounted on said frame and adapted to visually exhibit a reading on said dial face, a rod axially reciprocally movable with respect to said frame, means operatively connecting said pointer and rod for translating the axial position of said rod with respect to said frame into a dial reading, a piston secured to said rod and adapted to move therewith, means adapted to displace said piston in response to a pressure signal for moving said rod, a collar spaced axially of said piston, means for axially adjustably securing said collar with respect to said frame without rotation of said collar, said collar having an axial bore therethrough for slidably receiving said rod, a helical compression spring acting on said rod, said spring having a plurality of active wire coils surrounding said rod and having one end thereof contacting said piston, a helical groove on said collar and leading axially of said rod, said groove adjustably receiving said coils at the other end of said spring in response to relative rotations between said collar and said spring to change the number of active wire coils extending between said collar and said piston, said means for axially adjustably securing said collar permitting variations in the compression of said spring without alteration of the number of active wire coils on said spring, whereby said gage is adjustable to provide a variation in pointer deflection rate as well as load range.

2. A deflection rate and load range adjusting device comprising, a frame and a pressure responsive member movable with respect to said frame, a helical spring having a plurality of active wire coils and having one end thereof operatively bearing on said pressure responsive member, a retainer normally stationary with respect to said frame, said spring having the other end thereof operatively bearing against said retainer, means for adjustably securing said retainer on said frame coaxially of said spring without rotation of said retainer for adjusting the compression of said spring against said pressure responsive member, said means also adjustably securing said retainer on said frame for rotation with respect to said spring, said retainer having a helical groove therein adapted to adjustably receive and inactivate selected coils adjacent the other end of said spring by relative rotation of said retainer with respect to said spring, whereby the deflection rate and load range of said spring is selectively altered by selective coaxial and rotational adjustment of said retainer.

3. The device of claim 2 wherein said helical groove extends into the outer surface of said retainer.

4. A deflection rate and load range adjusting device comprising, a frame and a pressure responsive member movable with respect to said frame, a helical spring having a plurality of active wire coils and having one end thereof operatively bearing on said pressure responsive member, a retainer, said spring having the other end thereof operatively bearing against said retainer, means for adjustably securing said retainer on said frame coaxially of said spring without rotation of said retainer for adjusting the compression of said spring against said pressure responsive member, said retainer having a coaxial bore therethrough, a helical groove extending into the surface of said bore, said helical groove being adapted to adjustably receive and inactivate selected coils adjacent the other end of said spring by relative rotation of said retainer with respect to said spring, whereby the deflection rate and load range of said spring is selectively altered.

References Cited in the file of this patent

UNITED STATES PATENTS

| | | |
|---|---|---|
| 1,400,550 | Hopwood | Dec. 20, 1921 |
| 1,950,532 | Wasson | Mar. 13, 1934 |
| 2,437,440 | Rigden | Mar. 9, 1948 |
| 2,661,626 | Moffett | Dec. 8, 1953 |
| 2,725,749 | Green | Dec. 6, 1955 |
| 2,989,991 | Knoble | June 27, 1961 |